April 9, 1935. L. SCHWARZMAYR 1,996,886
WATER MOTOR
Original Filed Dec. 3, 1930   5 Sheets-Sheet 4
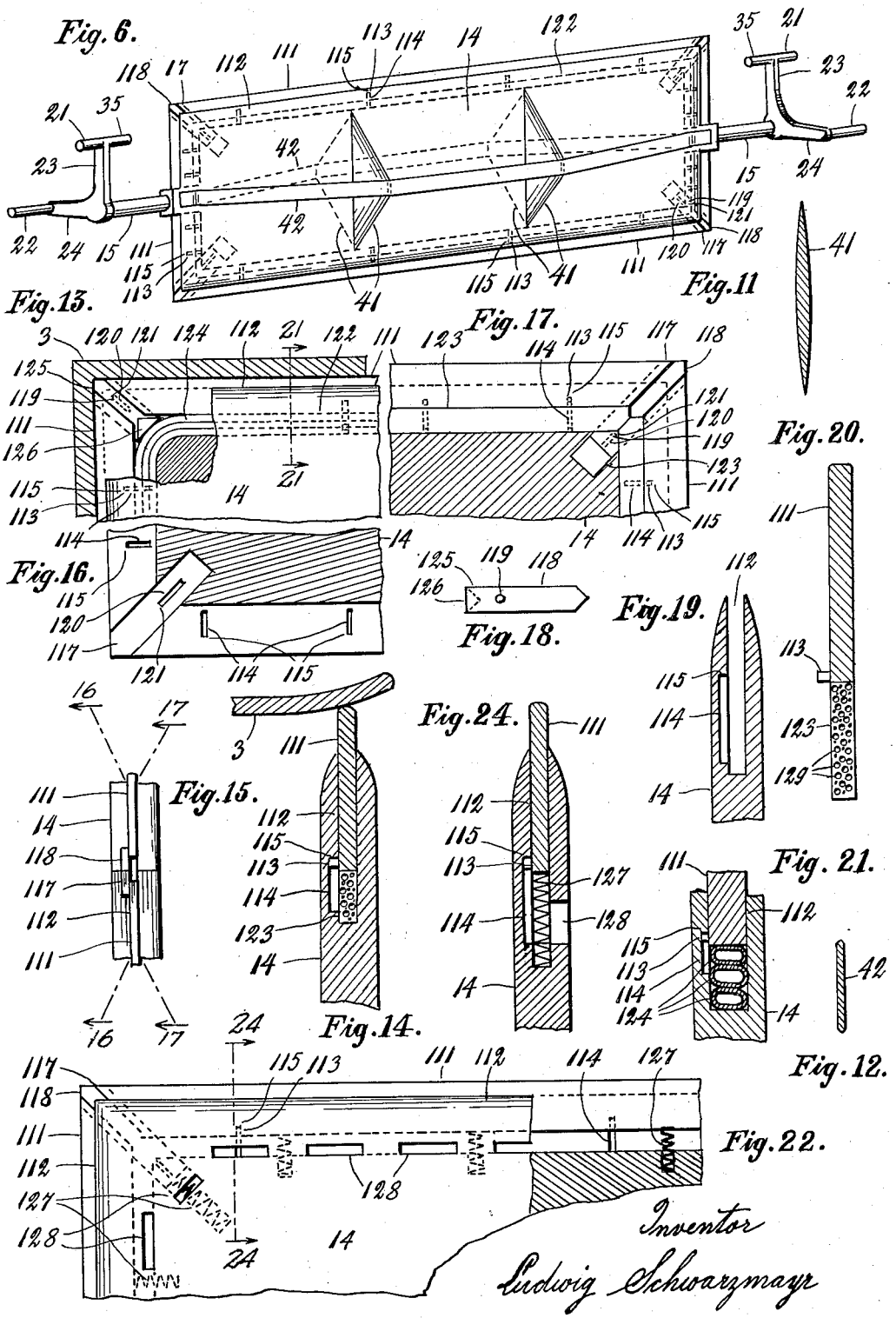

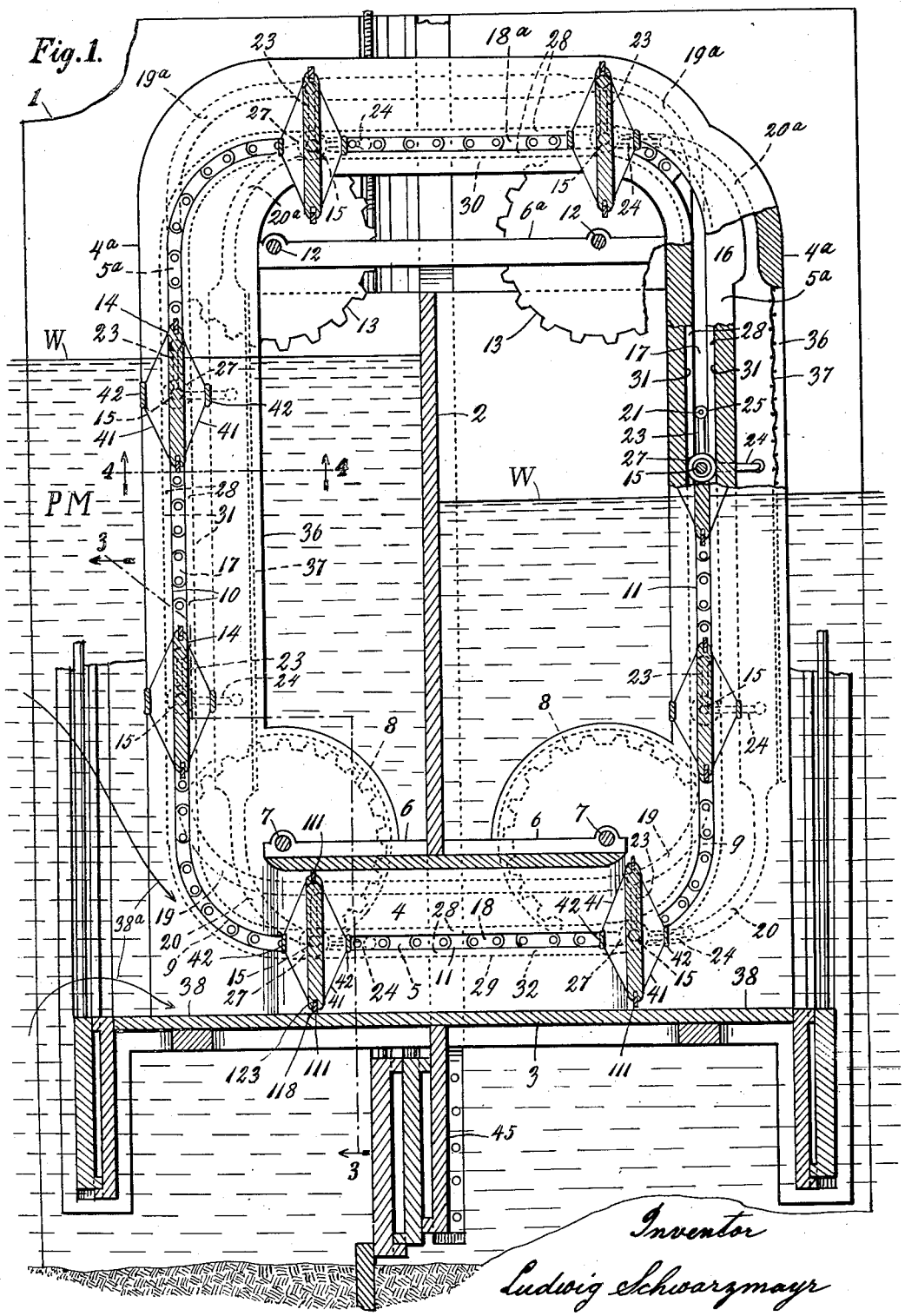

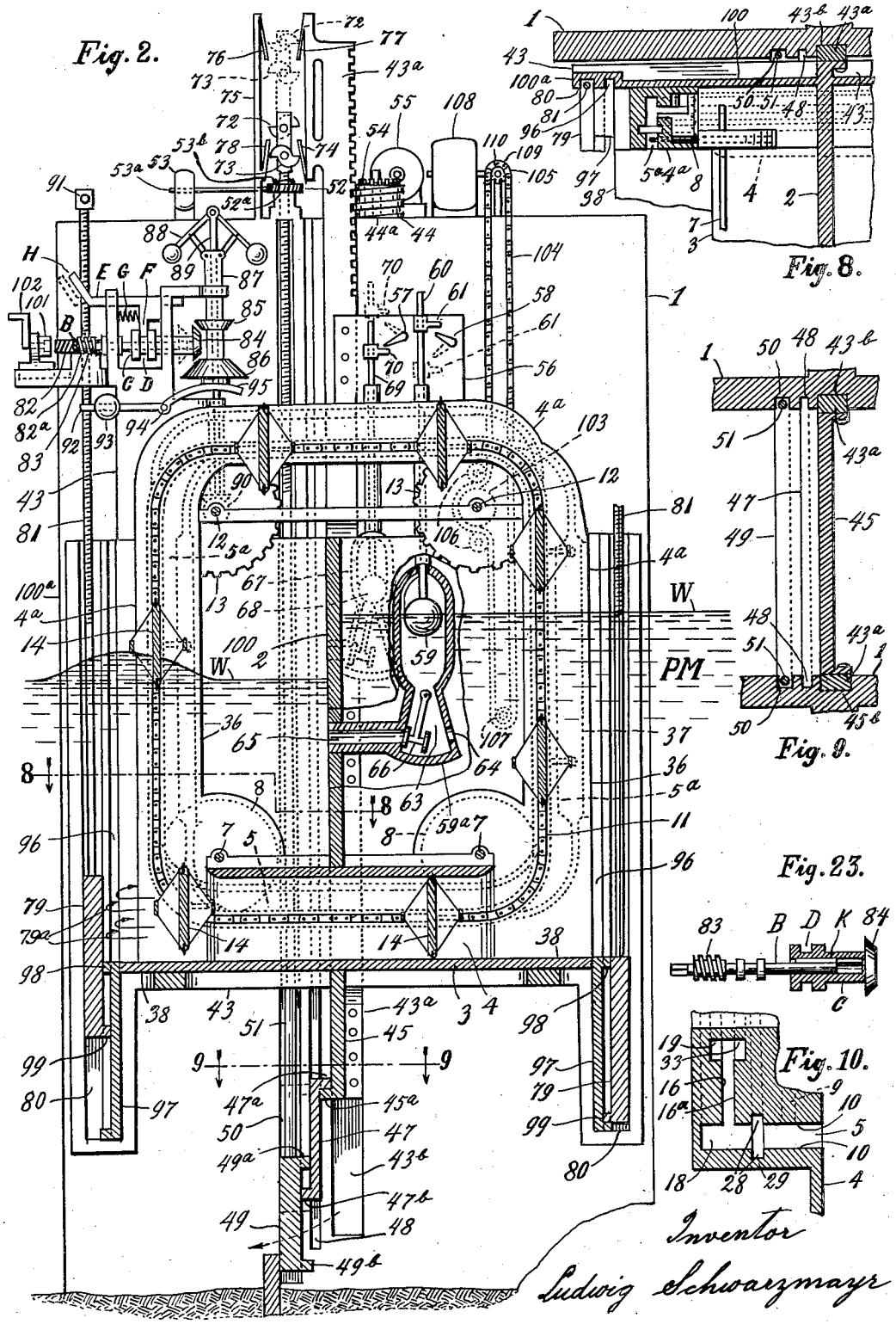

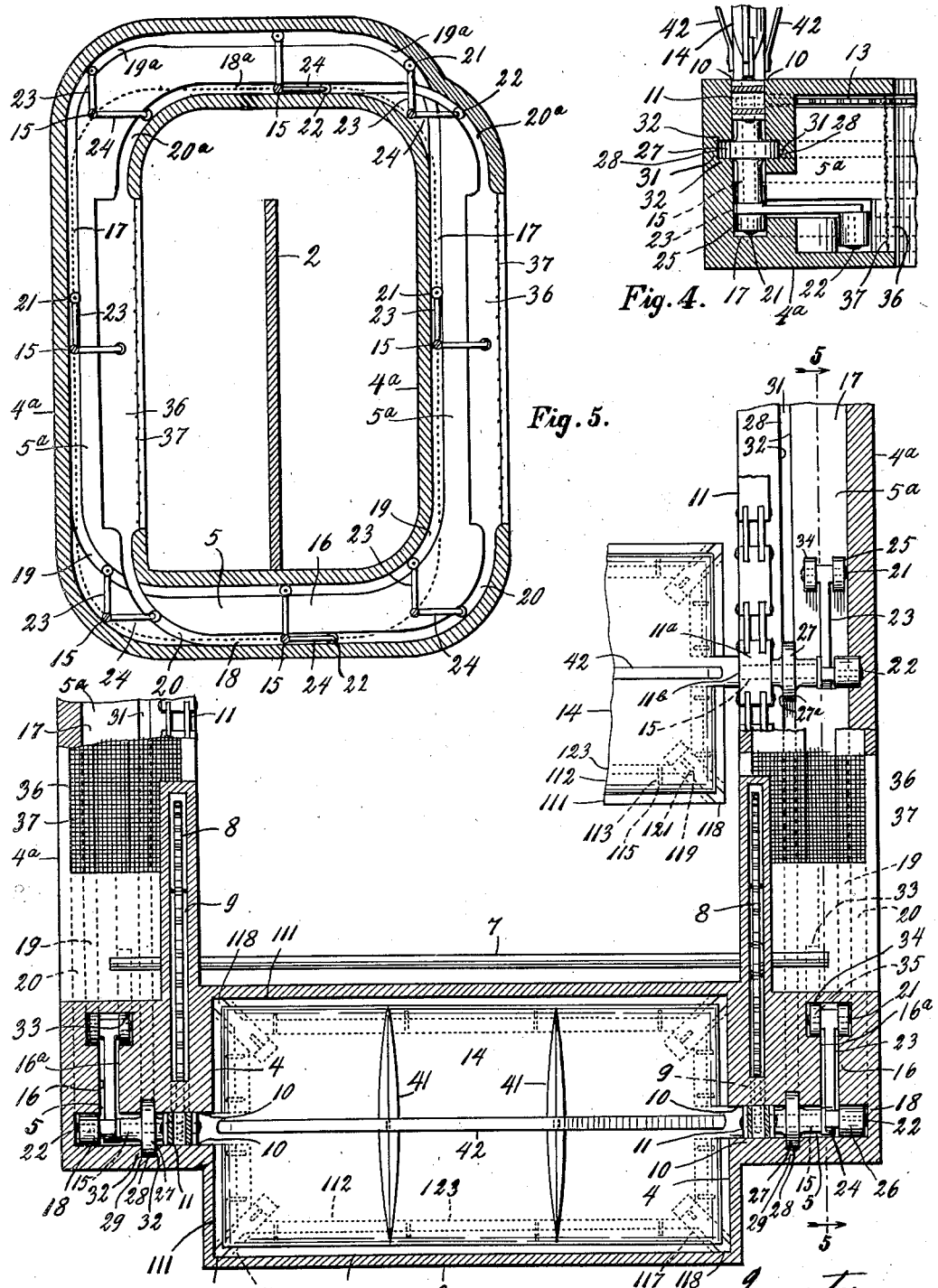

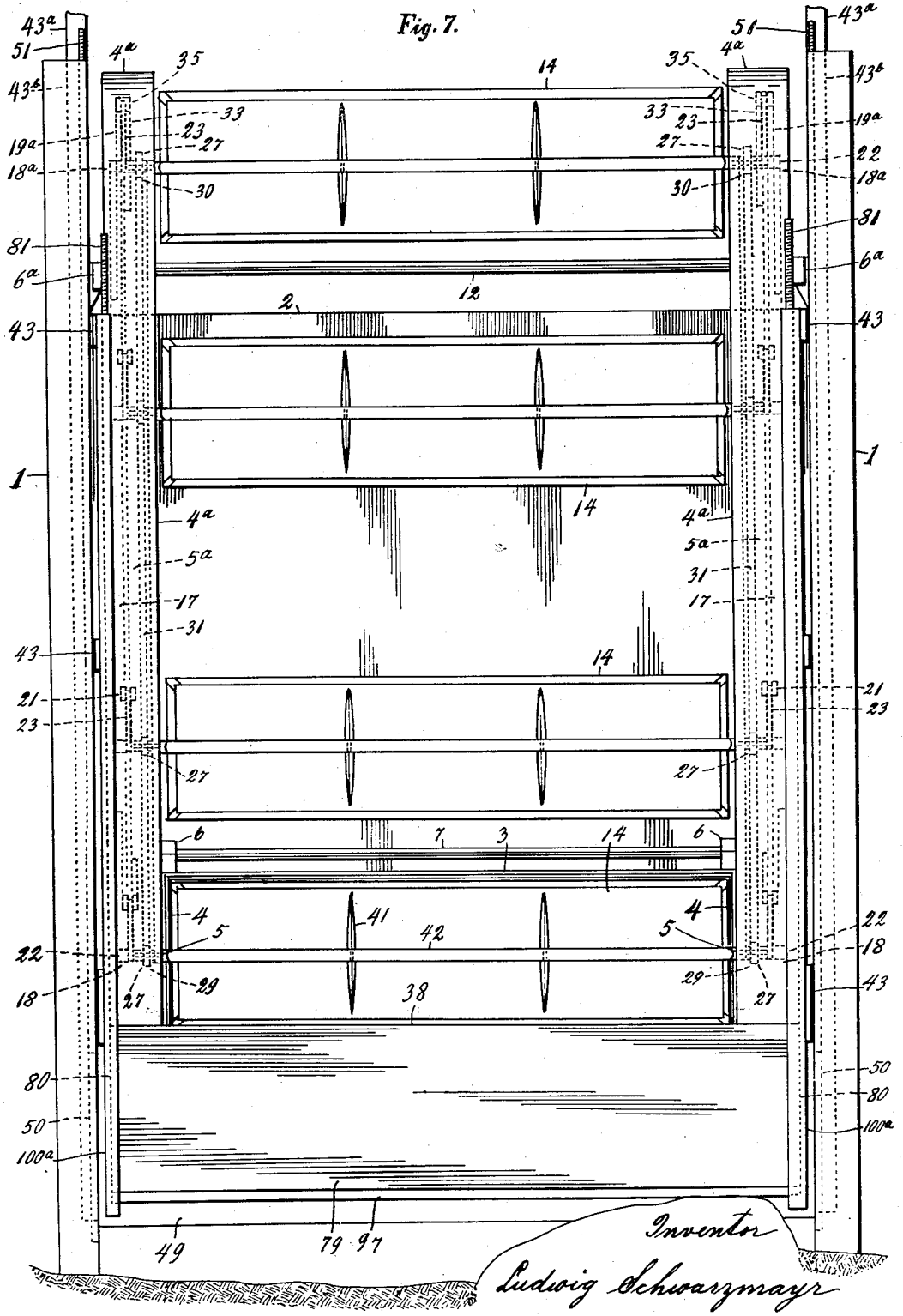

Patented Apr. 9, 1935

1,996,886

UNITED STATES PATENT OFFICE 1,996,886

WATER MOTOR

Ludwig Schwarzmayr, San Francisco, Calif.

Application December 3, 1930, Serial No. 499,742
Renewed September 19, 1934

27 Claims. (Cl. 253—20)

My invention relates to water motors in which power receiving blades supported between endless carriers are forced through a conduit by water under pressure of a head.

The motor is especially adapted for deriving power from flood and ebb of the tide. The head caused by in or outflowing tide is relatively low and the most favorable periods are short, and therefore the available energy, which is not utilized during those favorable periods, is lost, and with the object to transform the greatest amount of this source of energy into useful power, I construct a motor which is capable to run at a high speed under a low head pressure even if the power blades are relatively high for the purpose to enlarge their power receiving area.

Other objects of the invention are, to return the blades over a dam to a deep submerged conduit with a minimum resistance by the water through which they travel; to provide the motor with a crank chamber having a novel arrangement of guides and means preventing floating debris to enter to the guides; to strengthen the blades with truss members which receive the least resistance by the water through which they pass; to provide a motor of novel construction and arrangement which causes the water to flow to the conduit in a path substantially corresponding with the path of the blade moving to its power receiving position; to provide a blade having a packing which is capable of withstanding high head pressure but which yields quickly to edge pressure so as to prevent wedging in of the blades when debris comes between the blade and the wall of the conduit; to reduce suction action caused by the crank members moving through the chamber and to reduce lifting of water by the crank members to above the water level.

Further objects of the invention are, to provide a water motor which is adjustable to the changing height of the head of water during flood and ebb of the tide or during floods when used in rivers, and having means for automatically adjusting the conduit to a position below a head of water of constant pressure; to provide means to cause part of the water to pass beneath the conduit to prevent damage to the motor, and means for automatically controlling said means; to provide the motor with an adjustable baffle plate for controlling the speed of the motor, and means for automatically adjusting the baffle plate.

Other objects and advantages will be made apparent in the following description and defined by the appended claims.

I attain these objects by the mechanism illustrated in the accompanying drawings, in which—

Figure 1 is a detailed vertical section of a part of the motor with part of the guide chamber removed; Fig. 2, a vertical section of the entire motor showing mechanism for automatically adjusting the motor, means to automatically open and close the dam beneath the conduit, an adjustable baffle, and governor mechanism for adjusting the baffle; Fig. 3, a sectional view of a part of the motor on line 3—3 in Fig. 1; Fig. 4, a sectional view of the crank chamber on line 4—4 in Fig. 1; Fig. 5, a sectional view of the crank chamber on line 5—5 in Fig. 3; Fig. 6, a perspective view of the power blade; Fig. 7, a front elevation of part of the motor; Fig. 8, a sectional view on line 8—8 in Fig. 2, showing part of the motor as it appears after the removal of the blades, the endless carrier and cranks; Fig. 9, a sectional view on line 9—9 in Fig. 2; Fig. 10, a sectional view of the crank chamber as it appears after the removal of the cranks, guide wheel and chain; Fig. 11, a sectional view of a truss brace of the blade; Fig. 12, a cross section of a truss strap; Fig. 13, a detailed view of part of a blade showing packing plates and pneumatic tube spring.

Figure 14 is a sectional view of the peripheral portion of the blade in a modified form; Fig. 15, a perspective view of the corner of the blade; Fig. 16, a sectional view on line 16—16 in Fig. 15; Fig. 17, a sectional view on line 17—17 in Fig. 15; Fig. 18, a corner packing plate; Fig. 19, a cross section of the peripheral portion of the blade with packing members removed; Fig. 20, a cross section of the packing plate and the pneumatic spring member; Fig. 21, a sectional view of part of the blade on line 21—21 in Fig. 13; Fig. 22, a modification showing the plate supported by spiral springs; Fig. 23, a part of the drive connection adjusting the baffle plate, partly shown in section; and Fig. 24, a sectional view on line 24—24 in Fig. 22.

Similar numerals refer to similar parts throughout the several views.

The motor is supported by piers 1, preferably on a frame described hereinafter. Beneath a dam 2 is mounted a tube or conduit 3 forming a water passage therethrough. The dam separates two bodies of water WW, so that, when the difference in the water levels at the ends of the conduit is small, the inlet of the conduit may always be beneath the feed flow supplying body of water.

The conduit has at its opposite sides 4, 4 guide or crank chambers 5, 5 extending laterally therefrom. (See Figs. 1, 3 and 10.) These chambers have extensions 5a, 5a leading from the ends of the conduit vertically to above the dam, and are formed by members 4a, 4a extending from the side walls of the conduit. (See Figs. 1, 4, 5 and 7.)

On the lower frame member 6 are mounted shafts 7, 7, having guide wheels 8, 8 whose teeth project through cutaways, at 9, in the walls 10 of the guide chambers and engage the endless carriers 11. On the upper frame member 6a are mounted shafts 12, 12 having guide wheels 13, 13 supporting the carriers 11 which carry the blades 14 over the dam. The blades have shafts 15 which are pivotally supported by the carriers and travel in the crank chambers 5. The endwalls 16 of the crank chamber are provided with grooves or channels 17, 18, 18a 19, 19a, 20 and 20a to receive the crank pins 21 and 22 of the crank arms 23 and 24 carried by the shafts 15. (See Figs. 1, 3, 4 and 5.) The crank pins usually are provided with antifriction rollers 25 and 26. The pin of the vertically disposed crank arm 23 is guided by the walls of the grooves 17 and the crank-pin on the horizontally extending arm 24 travels in the grooves 18 and 18a.

The crank shaft 15 is provided with a guide wheel 27 having a hub bearing against the cranks with one end and against the carrier with the other. In each wall 10, 10 of the chamber between the carrier 11 and the crank guides 17, 18, 18a, 19, 19a, 20 and 20a is formed a channel 28 which receives the guide wheels 27. The bottom wall of the lower channel provides the track 29. Another track 30 is disposed above the dam, and the guides 31, 31 which extend from the ends of the track 29 to the track 30 are disposed vertically thereto. The side walls 32 of the channel 28 engage the sides 27a of the wheel 27 and prevent axial movement of the crank members in the chamber and the blades in the conduit. The tracks 29 support the blades in their movement through the conduit.

The vertical grooves 17 are in a plane with the guides 31, and the grooves 18 and 18a are in a plane with the tracks 29 and 30, respectively, at each junction of the guides 31 and the tracks, one of the grooves converges, and the other groove diverges from said plane and thereby the blades are positively retained against bodily pivotal movement, and in a position parallel with the vertical stretches when moving to and from those stretches. (See Fig. 1 and 5, in the latter the dotted line indicates the path of the crank shaft.)

One of the grooves is deeper than the other, and for the cranks which travel in the groove of less depth an auxiliary guide 33 is provided at the opposite wall 16a of the end wall 16 of the chamber, and is engaged by the antifriction roller 34 on the crank pin 35.

The chambers 5 receive the carriers 11 and their walls 10, 10 are adapted to cooperate with the carriers to prevent floating debris to come into the crank chambers.

To fully derive the power from the head of water, the crank chambers are provided with ports 36, 36 for water to flow into the chamber, so as to prevent suction by the downward moving crank members, and to provide an outlet for the water disposed in front of the upward moving crank members so as to prevent pumping of water to above the water level.

The ports 36 are provided with screens 37 to prevent floating debris coming therethrough into the chambers.

A block link 11a of the carrier provides a journal bearing 11b for the shaft 15.

I position the conduit below the pressure maintaining main supply body of water established by the dam 2 and indicated by reference character PM, so that the conduit and the blade therein continuously receive the full pressure of the head of water no matter how low the head is and how high the blades are, thereby the motor is caused to operate at a high speed under all conditions.

The bottom wall of the conduit has an extension 38, which prevents water flowing up adjacent the inlet, so that the feed flow is restricted to a path illustrated by the arrows 38a, which substantially corresponds with the path of the downward moving blades.

As shown in Figs. 1 and 2, the blades travel through the supply-body of water PM in engagement avoiding position, thereby formation of confused and obstructive motion in the feed flow is avoided. When such motors are used in conjunction with tide water the pressure head changes from one end of the conduit to the other in accordance with the tide movement.

I strengthen the blades with trusses, one on each side face thereof. The trusses have streamlined braces 41 as shown in cross-section in Fig. 11, and truss straps 42 whose wide sides are disposed parallel with the sides of the blades.

In the motor described above, the blades in their return movement over the dam to the conduit receive the least resistance by the water they pass through.

I prefer to provide the motor with a speed control as shown in Fig. 2, and under conditions where the change in the water level is great, I also provide adjusting mechanism as shown in Fig. 2.

A framework, generally indicated by reference numeral 43, is provided at its opposite sides with members 43a, 43a, each of which is slidably received in a channel 43b in the piers 1. (See Figs. 2, 7, 8 and 9.) The framework is supported by a worm 44 engaged by the rack 43c. The framework supports the conduit 3 and the blade supporting members previously described. By the lower part of the framework is supported the dam section 45 which extends down from the conduit. The upper frame members support the dam structure 2.

The dam section 45 is provided with a flange 45a engaging the flange 47a of the adjoining dam section 47, which is in guideways 48 in the piers and is normally supported by the flange 45a. Another dam section 49 having flanges 49a and 49b, is mounted in the guideways 50 in the piers, and is provided with a rod 51 by which it may be lifted. When the section 49 is lifted, the flange 49b engages the flange 47b and lifts the section 47. During downward movement the flange 49a engages the flange 47b to move this section to its position when frictional contact prevents this section to drop by its own weight. The rod 51, whose upper portion is threaded, passes through and is engaged by the threaded opening 52a of the gear 52, which is supported on the pier 1 and is operatively connected with the motor 53 by a suitable system of transmission. For illustration a shaft 53a extends from the motor 53 and has a worm at 53b to engage the gear 52.

The worm gear 44 turns on a stub shaft 44a, and a gear 54 at its upper side is engaged by a gear having a suitable drive connection with the motor 55 whereby the conduit is adjusted vertically to the desired depth.

As by flood and ebb tide movement the water level changes continuously, I prefer to provide a mechanism which automatically controls the operation of the motor 55. A switch board 56 having two switches 57 and 58 for the motor 55, is supported by the frame 43 so that the switches move up and down with the conduit. The float 59 supports a rod 60 having a cam 61 which, when the water level drops, engages and closes the switch 58 to start the motor 55 for downward adjustment of the conduit. After actuating the switch the cam 61 is in a position as shown by dotted lines. The switch 58 in its downward movement with the frame 43 is engaged by the float supported cam 61, and thereby the switch is drawn open to stop the motor.

The float 59 is in a completely enclosed chamber 63 formed by the casing 59ᵃ having two ports 64 and 65. The port 65 connects the chamber with the body of water disposed at the opposite side of the dam structure 2. In the chamber is a double valve 66 which automatically closes the port which connects the chamber with the body of water having the lowest level so that when, in the tide movement, the head of water changes to the opposite side of the dam the float 59 is during all conditions under the influence of the body of water having the highest level. The upper float chamber 67 is of the same construction as the chamber 63. The float 68 supports the rod 69 which carries the cam 70, and when the water level rises, the cam 70 engages the switch 57 to start the motor 55 in a direction opposite to the movement caused by the switch 58 and thereby lifts the conduit.

After actuating the switch, the cam 70 is in a position as shown by doted lines. The switch 57 in its upward movement is engaged by the float supported cam 70 and is moved to stop the motor.

The cam 61 on rod 60, and the cam 70 on rod 69 are adjustable thereon so that the conduit 3 may be positioned to the depth most favorable to existing conditions.

To prevent damage to the motor when under abnormal conditions the motor arrives at the limit of its upward movement, I provide means which automatically opens the dam below the conduit so that the surplus water may pass therethrough. I carry this out by having two switches 72 and 73 supported by the rod 51. The switch 72 is for starting the motor 53 to cause upward movement of the rod carrying the dam section 49. On the frame 43ᵃ is a cam 74, which in its upward movement engages the switch 72 and thereby starts the motor 53 to move the rod with the dam section and switch upward as is shown in dotted lines. Thereby water is permitted to pass through beneath the section 49. A post 75 supported on the pier is provided with a cam 76 which engages the switch 72 in its upward movement to stop the motor. When the water level drops and the frame 43ᵃ is moved down by the float controlled motor 55, the cam 77, supported by the frame 43ᵃ, engages the switch 73 (shown in dotted lines) and starts the motor in a direction opposite to the movement caused by the switch 72 and thereby lowers the dam section 49. The cam 78 on the post engages the switch 73 in its downward movement and stops the motor. The cams 74, 76, 77 and 78 are springs and yield to the switch arms when they pass in the direction opposite of their own pitch.

For controlling the speed of the motor I provide baffle plates 79 adjustably mounted in guideways 80 at the delivery ends of the conduit. Each baffle plate is provided with a rod 81 having a threaded upper portion which passes through the threaded opening 82ᵃ of a worm gear 82, which is supported by the frame 43 and engaged by the worm 83 on the shaft B. A sleeve C held against rotation on the shaft by a key K (see Fig. 23) is slidable axially, and has at its end a beveled gear 84, which is adapted to be engaged by either of the opposite gears 85 and 86 on the sleeve 87, which is supported by the governor 88 and is slidable axially but held against rotation on the shaft 89. The latter has a drive connection 90 with the shaft 12.

The drive connection 90 is operatively engaged by the shaft 12 when the shaft turns in one way, and is disconnected when the shaft turns the opposite way, so that the adjusting mechanism is operatively engaged by the shaft, only when it is disposed at the delivery side of the conduit. This drive connection may be of any known type.

In the frame 43 is mounted a bar E having an arm F engaging the sides of the groove D in the sleeve C to retain the gear 84 in position. A spring G bearing against the frame and against the arm F normally holds the gear 84 in a position in which it may be engaged by either of the gears 85 or 86. From the rod 81 projects a pin 91 which in its downward movement engages the cam member H on bar E, and thereby shifts the gear 84 out of engaging position with the gear 85 as shown in dotted lines. The lower gear 86 is larger than the upper gear and is adapted to engage the gear 84 when the latter is in a position as shown in dotted lines, so when the motor again obtains a speed above normal the baffle plate may be adjusted.

On the frame 43 is pivotally mounted a lever 92, having a weight 93 at one side of the pivot 94 and a fork 95 at the other for partially supporting the gears 85 and 86. The weight is adjustable on the lever so it may be shifted to or from the pivot, so that the gear 84 may be sooner or later engaged by one or the other of the gears 85 and 86. The water which passes out from the conduit, due to its inertia seeks to move in a straight path and the collision with the baffle plate causes a reaction and congestion obstructively affecting the following blade and thereby instantly slows down the speed of the motor. The arrows 79ᵃ indicate the force in moving water and the reaction caused by the baffle.

In the guideway 96 is slidingly mounted the plate 97 which is provided with a flange 98 engaged by the flange 99 of the baffle plate 79, and is lifted thereby. The guideways 80 and 96 are formed in a member 100ᵃ of the frame 43. A side wall 100 provides a connection between the dam structure 2 and the frame member 100ᵃ, and provides with the plates 79 and 97 an enclosure whereby the water may be completely shut off from the conduit to stop the motor or whereby the difference of the normally existing water levels at the opposite side of the dam may be reduced to slow down the motor.

A handle 102 provided with a clutch 101 adapted to engage the shaft B is mounted on the frame 43 so that it may be shifted into engagement with the said shaft, whereby the plates 79 and 97 may be adjusted to stop the motor.

When the motor is used in tide water, one of the above described mechanisms is mounted at each side of the dam structure.

It will be understood that as the power blades are forced through the conduit by the water from the higher level, the carriers transmit the power to the shafts 12, one of which is provided with a wheel 103 which has a drive connection with the generator 108 supported upon the pier. Preferably I provide a belt or chain 104 which provides a drive-connection between the wheel 103 and the wheel 105 mounted upon the pier. When the motor is mounted vertically adjustable, the chain 104 runs over the idlers 106 supported by the frame 43, and over the lower idler 107 supported by the pier and disposed perpendicularly beneath the wheel 105 and parallel with the movement of the frame 43.

A drive connection 109 having a reversing gear at 110 is provided between the gear 105 and the generator so that by change in the tide movement when the gear 105 reverses its movement, the generator may be continuously driven in one direction. The motors 53 and 55 also are provided with hand operated switches (not shown).

I provide the blades 14 with packing members as shown in Figs. 13, 14, 15, 16, 17, 18, 19, 20, 21, 22 and 24.

Packing plates 111 are slidingly mounted in recesses 112 at the peripheral portion of the blade. Stubs 113 project from the sides of the plates into the grooves 114 formed in the walls of the recesses. The plates are guided thereby, and their outward movements are limited by the endwalls 115 of the grooves. At each corner of the blade is a recess 117 which is disposed at acute angles relative with the edges of the blade and receives the plate 118 which overlaps with the end portions of the plates 111. The plate 118 also has a stub 119 received by the recess 120 whose end wall 121 limits the outward movement of the plate. The plates are held by spring members 122 in contact with the walls of the conduit 3. Three types of spring members are shown in the drawings. Figs. 14, 17 and 20 show a spring consisting of an elastic rubber body 123 having many cells 129 which are permanently filled with air. This body completely fills up the bottom of the recess.

Figs. 13 and 21 show a spring consisting of pneumatic rubber tubes 124 disposed at the bottom space of the recess and prevents entrance of water. The corner plate 125 is provided with a shoulder 126 projecting sideward to receive the support of the tubes 124. The tubes are provided with valves (not shown in the drawings) which may be of any known design in common use in connection with pneumatic rubber tubes and through which lost air may be replaced.

Figs. 22 and 24 show spiral springs 127 for supporting the plates. At one side of the blade, in the wall forming the recess, are ports 128 for the water to flow out. As shown in Fig. 24, the ports 128 have a flow area larger than the inner edge face of the plate 112 so that the plates may yield quickly when the blades enter the conduit, or when debris comes between the wall of the conduit and the packing plate.

From the adjusting members 44, 52, and 82, suitable drive connections extend to the supporting members at the opposite pier to effect a corresponding adjustment. (Not shown in the drawings.)

While the preferred form of the invention is hereinbefore set forth, it is to be understood that I am not to be limited to the exact construction illustrated, because various modifications of these details may be made within the scope of the appended claims, when putting this invention into practice.

I do not claim the combination of a water motor with a speed controlling means broadly because head gates for controlling the speed of water motors are in common use.

I claim:

1. In a water motor, a conduit, a dam associated with the conduit to accumulate a main supply-body of water above one end of the latter, endless carriers having blades traversing the conduit under pressure of water flowing therethrough, and means for causing said blades to travel in engagement avoiding position when moving from above said dam through the supply body of water to said conduit to reduce formation of confused and obstructive motions in the feed flow.

2. In a water motor, pier members, a conduit vertically adjustable thereon, a dam structure above the conduit to maintain a head of water at one side thereof, a carrier having blades traversing the conduit under pressure of water flowing therethrough, a collapsible dam beneath said conduit and supported at opposite sides by said piers, and means upon said piers for adjusting the conduit relative to a body of water above the conduit.

3. In a water motor, a conduit, a dam structure above said conduit, carriers having blades traversing said conduit, a collapsible dam beneath the conduit and comprising sliding sections, and means for adjusting said sections to open a passage for the water at a point removed from the conduit.

4. In a water motor, a conduit, a dam above said conduit to separate two main bodies of water and to accumulate a pressure head selectively at either of its sides, endless carriers having blades traversing the conduit under pressure of water flowing therethrough, and means for retaining the blades in engagement avoiding position during movement in either direction from the conduit to above said dam at one side thereof and down to the conduit at the other.

5. In a water motor, a tubular conduit having chambers extending laterally from its opposite sides, a dam above said conduit to separate two main bodies of water, endless carriers in said chambers, power receiving blades between said carriers and traversing the conduit under pressure of water flowing therethrough, a track in each chamber, guideways for said blades extending from the ends of each track to above said dam and arranged in planes perpendicular relative to the tracks, and means cooperating with said guideways for holding said blades in positions with face-sides in planes with the guideways.

6. In a water motor, a dam to establish a head of water, a conduit associated with said dam and disposed beneath a head of water of constant pressure, each side of the conduit being provided with a chamber extending laterally therefrom and having extensions leading to above the said dam, endless carriers having blades traversing the conduit under pressure of water passing therethrough, means in said chamber for causing the blades to travel from above the said dam in resistance avoiding position to the conduit.

7. In a water motor, a dam to maintain a head of water, a conduit disposed beneath said dam, said conduit provided with chambers extending laterally from its opposite sides and having extensions leading to above the said dam, endless carriers having power receiving blades traversing the conduit under pressure of a head of water, means in said chamber for causing the blades to travel from above the said dam to the conduit in a path perpendicular relative with the conduit, and means also in said chamber for retaining the blades in position with sides parallel with said perpendicular path.

8. In a water motor, a dam, a conduit provided with chambers at its opposite sides, said chambers having extensions leading over the said dam, endless carriers having blades traversing the conduit, means in said chambers for retaining the blades against bodily pivotal movement, means also in said chambers for retaining the blades against lateral movement, said chamber having means for preventing entrance of floating debris.

9. In a water motor, a dam structure to maintain a head of water, a deep submerged conduit, endless carriers, power receiving blades supported between said carriers and traversing the conduit under pressure of a head of water, means for causing the blades to travel in edgewise position in their movement through the head of water, and truss members at each face side of the blade to prevent bending of the blade, said truss members comprising streamlined braces and tension straps disposed with wide sides parallel with the face sides of the blade.

10. In a water motor, a dam structure, a conduit, endless carriers, pressure receiving blades for movement through the conduit, means for retaining the blades against vertical and lateral movement in their travel through the conduit, said blades having peripheral recesses, packing plates slidingly mounted in said recesses and arranged to overlap each other at the corners of the blades, means for holding said packing plates in contact with the walls of the conduit, means for guiding said plates in their outward movements, and means for limiting their outward movements when out of engagement with the walls of the conduit.

11. In a water motor, a support, a framework vertically adjustable thereon, a conduit carried by said framework, a dam structure above said conduit to maintain a head of water, endless carriers having power transmitting blades for movement through the conduit, a collapsible dam beneath the conduit and comprising slidingly mounted sections supported by said framework when in extended position, and means for automatically adjusting said conduit to a predetermined position relative to a body of water above the conduit.

12. In a water motor, a support, a framework vertically adjustable thereon, a conduit carried by said framework, a dam structure above said conduit to separate two bodies of water, carriers having blades traversing the conduit, means mounted upon the support for adjusting said framework, means for automatically controlling the operation of said adjusting means, a collapsible dam beneath the conduit and comprising slidingly mounted sections, one of said sections supported by said framework and having means for supporting the adjoining section to extend the dam.

13. In a water motor, a support, a framework vertically adjustable thereon and carrying a suspended conduit a dam structure above said conduit endless carriers having blades traversing the conduit, a collapsible dam beneath the conduit, means upon said support for adjusting the framework, means for automatically controlling operation of said adjusting means, said means comprising a control member supported by said frame, a float supporting a cam for actuating said control member under predetermined conditions, and a casing forming a chamber in which said float may move up and down and having a port.

14. In a water motor, a support, a framework vertically adjustable thereon and carrying a suspended conduit, a dam structure for establishing a head of water alternately at each side thereof, means on said support for adjusting said framework, means on said framework for controlling said adjusting means, a float and means supported thereby for actuating said controlling means, a chamber for said float and having two ports, each of which connects the chamber with a different body of water at opposite sides of the dam, and means in said chamber to automatically close one of said ports to break the connection with one of the said bodies of water.

15. In a water motor, a dam to establish a head of water, a conduit mounted below said dam, a collapsible dam disposed beneath the conduit and comprising slidingly mounted sections, power conducting members for operation in the conduit, and means for automatically adjusting said sections to open or close a water passage beneath the conduit.

16. In a water motor, a support, a framework vertically adjustable thereon and carrying a conduit, a dam above the conduit, means for automatically adjusting said frame and conduit relative to the water level, a collapsible dam disposed beneath the conduit and comprising slidingly mounted sections, endless carriers having blades traversing the conduit, a rod supporting certain of said sections, means upon said support operatively connected with said rod for adjusting said sections to open or close a water passage beneath the conduit, means supported by said rod for controlling operation of the last mentioned adjusting means, cams on said frame to actuate said controlling means for upward and downward adjustment of said sections, cams on a fixed member to engage said controlling means to terminate upward and downward movements of said sections.

17. In a water motor, a dam structure to maintain a head of water, a conduit, endless carriers having blades traversing the conduit under pressure of water flowing therethrough, a baffle plate adjustably mounted at the delivery of the conduit, and means for automatically adjusting said baffle plate relative to the natural path of water flowing at a speed from the conduit.

18. In a water motor, a dam structure to sustain a head of water, a conduit, power transmitting members, power receiving blades associated with said power transmitting members and traversing the conduit under pressure of water passing therethrough, a plate adjustably mounted at one end of the conduit, plate adjusting mechanism adapted to be operatively connected with one of said power transmitting members, and means for automatically establishing and breaking a drive connection between the said plate adjusting mechanism and the said power transmitting member at a predetermined speed of the latter.

19. In a water motor, a dam structure to establish a head of water, a conduit, power transmitting members and endless carriers mounted thereon, blades on said carriers for traversing the conduit under pressure of water flowing therethrough, a plate adjustably mounted at the delivery of the conduit, means for automatically adjusting said plate to control the speed of water flowing through the conduit, said means comprising, adjusting means adapted to be operatively connected with said power transmitting members, and means operated by said power transmitting members to automatically establish and break a drive connection between the power transmitting members and said adjusting means at a predetermined speed of the former and separate means for automatically breaking said drive connection to terminate downward adjustment of said plate independent of the speed of said power transmitting members.

20. In a water motor, a conduit, a dam to separate two bodies of water above the conduit, each side of the conduit being provided with a crank chamber extending laterally therefrom and having extensions leading over said dam, endless carriers having power receiving blades forced through the conduit by the pressure of a head of water, crank members carried by said blades adapted for movement through said chamber, a guide in said chamber for carrying the blades in vertical paths relative with the conduit to above the said dam at one side thereof and down at the other, and means also in said chamber to engage the said cranks for retaining the blades in vertical position relative with the conduit in their movement over the said dam.

21. In a water motor, a dam, a conduit provided with crank chambers extending around the dam, endless carriers in said chambers, power deriving blades for movement through the conduit and having shafts for movement through said chambers, cranks carried by the shafts, guides for the cranks in each chamber, a guide wheel on each shaft between said cranks and the carriers, said chambers being formed by walls arranged parallel with the crank shafts and having channels in which said guide wheels travel.

22. In a water motor a dam to establish a head of water, a deep submerged conduit disposed beneath said dam and provided with crank chambers extending to above the dam, endless carriers in said chambers, power receiving blades traversing the conduit under pressure of water flowing therethrough, crank members carried by said blades and traversing said chambers, said chambers having ports for water to flow into and out from the chambers, and means for preventing entrance of floating debris to the chambers.

23. In a water motor, a dam, a conduit beneath the dam, endless carriers having stretches extending vertically from the ends of the side walls of the conduit to above said dam, power receiving blades traversing the conduit and being pivotally supported by said carriers when moving with said vertical stretches, a crank projecting perpendicularly from each supporting member of said blades and parallel with the sides of the blades, a vertical guide for the blades disposed above the end of each side wall of the conduit, and another guide disposed in a plane with the first mentioned guide and engaging the said cranks.

24. In a water motor, a dam structure, a conduit, a member having a chamber provided with tracks and upright guides between said tracks, endless carriers in said chamber, power deriving blades having crank shafts engaged by said tracks and guides, the end wall of said chamber having a retaining groove disposed in a plane with the path of said crank shaft, a cam groove extending from one end of the retaining groove and converging with the path of the crank shaft, and a second cam groove extending from the other end of the retaining groove and diverging from the path of the crank shaft to the opposite side in respect to the first mentioned cam groove, and a crank member carried by said shaft and being engaged by the walls of said grooves.

25. In a water motor, a dam structure, a conduit, a member of the conduit having a crank chamber, said chamber having a track and a guide disposed at right angles to each other, endless carriers having blades disposed to traverse the conduit, a shaft extending from said blades and engaged by said track and guide, said shaft provided with two cranks, one of which projects horizontally from the shaft and disposed at right angles with the sides of the blade and with the other crank, guides for said cranks, one of said crank guides being disposed in a plane with the first mentioned guide and the other in a plane with the said track, said crank-guides having extensions at the junctions of said track and shaft-guide to cause one of the cranks to move from the path of the said shaft and the other to move to the said path.

26. In a water motor, a dam structure comprising upper and lower members, a conduit disposed between said members, endless carriers having power receiving blades traversing the conduit under pressure of water flowing therethrough, said conduit having an extended lower wall to limit the feed flow to a path substantially corresponding with the path of the downward moving blades.

27. A power blade having peripheral recesses adapted to receive packing plates, certain walls of said recesses having ports communicating with the exterior and the bottom portions of the recesses, and a packing plate having an inner edge face smaller in area than the flow of said ports.

LUDWIG SCHWARZMAYR.